United States Patent
Van Schaik

(10) Patent No.: US 10,341,023 B2
(45) Date of Patent: Jul. 2, 2019

(54) TERMINAL ENCLOSURE WIRELESS BASE STATION

(71) Applicant: CenturyLink Intellectual Property LLC, Denver, CO (US)

(72) Inventor: Richard Van Schaik, Galena, OH (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 15/727,049

(22) Filed: Oct. 6, 2017

(65) Prior Publication Data

US 2018/0109320 A1   Apr. 19, 2018

Related U.S. Application Data

(60) Provisional application No. 62/410,253, filed on Oct. 19, 2016.

(51) Int. Cl.
| | |
|---|---|
| *H04J 14/00* | (2006.01) |
| *H04B 10/2575* | (2013.01) |
| *H04B 10/67* | (2013.01) |
| *H04B 10/64* | (2013.01) |

(52) U.S. Cl.
CPC ..... *H04B 10/25753* (2013.01); *H04B 10/676* (2013.01); *H04B 10/64* (2013.01)

(58) Field of Classification Search
CPC ........ H04B 10/25753; H04B 10/25752; H04B 10/25759; H04B 10/2575; H04J 14/0245
USPC ..... 398/66, 67, 68, 69, 72, 115, 116, 98, 99, 398/100, 79, 158, 159, 76; 370/352, 392, 370/389, 468, 401, 328, 329
See application file for complete search history.

(56) References Cited

U.S. PATENT DOCUMENTS

| | | | |
|---|---|---|---|
| 6,895,185 B1* | 5/2005 | Chung | H04B 10/272 398/115 |
| 7,761,094 B2* | 7/2010 | Stein | H04Q 3/005 455/417 |
| 2009/0097855 A1* | 4/2009 | Thelen | H04B 10/25752 398/115 |
| 2012/0020668 A1* | 1/2012 | Trojer | H04L 12/2885 398/115 |
| 2014/0314412 A1* | 10/2014 | Soto | H04L 12/2898 398/67 |

* cited by examiner

*Primary Examiner* — Hanh Phan

(57) ABSTRACT

Novel tools and techniques for provisioning a wireless base station functionality at a terminal enclosure are provided. A system includes a first network device, first transceiver, first antenna, second network device, second transceiver, and a second antenna. The first network device may be communicatively coupled to a first network via a first medium and a second medium. The first network device may include a first transceiver coupled to the first network via the first medium, and a first antenna coupled to the first transceiver. The second network device may be coupled to a second network, and include a second transceiver coupled to a second antenna. The first and second network devices may be configured to communicate wirelessly, wherein data communicated from the second network device to the first network device is transmitted to the first network via the first medium.

20 Claims, 4 Drawing Sheets

TERMINAL ENCLOSURE WIRELESS BASE STATION

CROSS REFERENCE TO RELATED APPLICATIONS

This application claims priority to U.S. Provisional Patent Application Ser. No. 62/410,253 filed Oct. 19, 2016 by Richard Van Schaik, entitled "Method of Using a POTS Terminal Enclosure as a Wireless Base Station Providing Wireless Internet Access to Multiple Network Interface Devices."

The respective disclosures of these applications/patents (which this document refers to collectively as the "Related Applications") are incorporated herein by reference in their entirety for all purposes

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to telecommunications systems, and more particularly to tools and techniques for providing a wireless base station to multiple network interface devices through existing terminal enclosures.

BACKGROUND

Telephone lines have been used as a communication medium for both data and telephone service. Telephone lines, typically twisted pair copper cables, are a traditional and still ubiquitous communication medium used for telecommunications. Even as technology has advanced, rendering services provided over telephone lines like plain old telephone service (POTS) a legacy technology, much of the infrastructure of the underlying physical network, including the telephone lines and terminal enclosures, for providing service over telephone lines is still widely deployed.

As demand for bandwidth and transmission speed has increased, the use of existing twisted pair copper cables has been replaced by other transmission media, such as fiber optic cables. However, last mile connectivity to the home often relies on copper cables, such as twisted pair or coaxial cable. Replacing these communication media with fiber optic cables involves both cost and labor-intensive processes. This may include the excavation and trenching of roads, yards, curtilage, and other areas where new cable needs to be buried to reach the customer premises.

Accordingly, tools and techniques are provided for the provisioning of last mile connectivity, for broadband services, wirelessly to the home.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
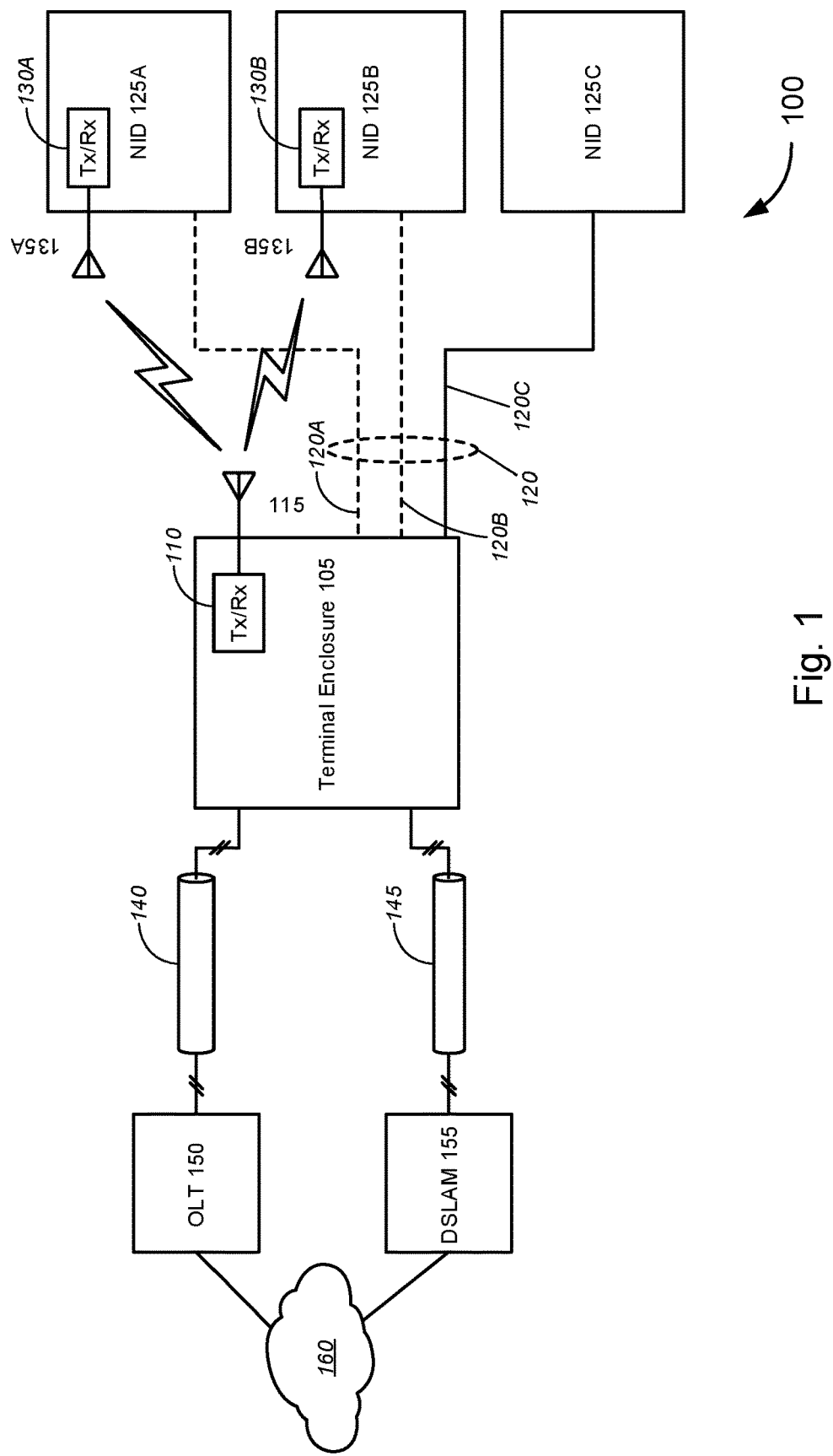
FIG. 1 is a schematic illustration of a system for provisioning a wireless base station at an existing terminal enclosure, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a system for a terminal enclosure base station may include a first network device and a second network device. The first network device may be communicatively coupled to a first network via a first medium and a second medium. The first network device may include a first transceiver coupled to the first medium, and a first antenna operatively coupled to the first transceiver. The second network device may be communicatively coupled to a second network. The second network device may include a second transceiver in communication with the second network, and a second antenna operatively coupled to the second transceiver. The second network device may be configured to transmit data from the second network to the first transceiver, and receive data from the first network via the second transceiver. The first network device may be configured to transmit data received from the second network, via the first transceiver, to the first network, via the first medium, and transmit data received from the first network, via the first medium, to the second network, via the first transceiver. The first network device may be communicatively coupled to at least one other network device via a wired connection of the same type as the second medium, wherein the first network device is configured to couple at least one other network associated with the at least one other network device to the first network.

In another aspect, an apparatus for a terminal enclosure access point is provided. The apparatus may include a network device and transceiver. The network device may be configured to communicate with a first network via a first and second medium. The transceiver may include a radio and antenna. The transceiver may be coupled to the first network via the first medium. The radio may be configured to convert data received from the first network, via the first medium, to a first wireless signal. The antenna may be operatively coupled to the radio and configured to transmit the first wireless signal to a receiving device, wherein the antenna may further be configured to receive a second wireless signal from a second network. The radio may be configured to convert the second wireless signal into data received from the second network, and transmit the data received from the second network to the first network via the first medium. The network device may be configured to be communicatively coupled to at least one other network device via a wired connection of the same type as the second medium, wherein the network device is configured to communicatively couple at least one other network associated with the at least one other network device to the first network.

In a further aspect, a method for providing a terminal enclosure wireless base station. The method includes providing, at a network device, one or more connections to a first network via a first medium and a second medium. The method continues by converting, with a transceiver of the network device, data from the first network received via the first medium into a first wireless signal. The method includes transmitting, via the transceiver, the first wireless signal to a network interface device. The method continues by receiving, via the transceiver, a second wireless signal from a second network associated with the network interface device. The method further includes converting, with the transceiver, the second wireless signal to data received from the second network. The method then continues by transmitting the data received from the second network to the first network via the first medium. The method further includes transmitting data received from the first network via the second medium to another network device utilizing a wired connection of the same type as the second medium.

FIG. 1 is a schematic illustration of a system 100 for provisioning a wireless base station at an existing terminal enclosure. According to various embodiments, the system 100 includes a terminal enclosure 105 having an enclosure transceiver (Tx/Rx) 110 and an enclosure antenna 115, a plurality of subscriber lines 120 of a first type of communication medium including a first subscriber line 120A, a second subscriber line 120B, and third subscriber line 120C, a plurality of network interface devices (NID) 125 including a first NID 125A, second NID 125B, and third NID 130B, a first transceiver 130A of the first NID 125A, a first antenna 135A of the first NID 125A, a second transceiver 130B of the second NID 125B, a second antenna 135B of the second NID 125B, a first provider line 140, a second provider line 145, an optical line termination (OLT) 150, a digital subscriber line access multiplexer (DSLAM) 155, and network 160. It should be noted that the components of the system 100 are schematically illustrated in FIG. 1, and that a variety of hardware configurations are possible in accordance with various embodiments.

In the embodiments depicted, on a provider facing side, the terminal enclosure 105 may be coupled to the network 160 via the first provider cable 140, which may be coupled to an OLT 150. The terminal enclosure 105 may, alternatively or additionally, be coupled to the network 160 via the second provider cable 145, which may in turn be coupled to a DSLAM 155.

On a customer premises facing side, the terminal enclosure 105 may be coupled to the plurality of NIDs 125 via a plurality of subscriber lines 125. The terminal enclosure 105 may be coupled to first NID 125A wirelessly. The enclosure transceiver 110 may be communicatively coupled, via the enclosure antenna 115, to the first transceiver 130A of the first NID 125A via the first antenna 135A of the first NID 125A. Alternatively or in addition to the wireless connection, the terminal enclosure 105 may also be coupled to the first NID 125A via a wired connection over the first subscriber line 120A. Similarly, the terminal enclosure 105 may be coupled to the second NID 125B wirelessly, where in the enclosure transceiver 110 may also be communicatively coupled to the second transceiver 130B of the second NID 125B via the enclosure antenna 115 and second antenna 135B, respectively. The terminal enclosure 105 may, alternatively or in addition to the wireless connection, be coupled to the second NID 125B via a wired connection over the second subscriber line 120B. The terminal enclosure 105 may further be coupled to the third NID 125C via wired connection over the third subscriber line 120C.

In various embodiments, the terminal enclosure 105 may be any enclosure configured to house at least part of a plurality of transmission lines, and at least part of a plurality of subscriber lines 120 to be connected to a plurality of NIDs 125. The terminal enclosure 105 may include, without limitation, a service area interface or outside plant, configured to provide wiring terminals, repeaters, etc. for individual lines of a local loop and/or last mile connection, and located between a central office and a demarcation point. Terminal enclosures may include, without limitation, a standing enclosure, mounted enclosure, underground enclosure, cabinet, pedestal, vault, and drops. Thus, the terminal enclosure 105 may include a body configured to house, without limitation, one or more of wiring terminals, power supplies, batteries, cooling equipment, surge protectors, distribution frames, splice devices, or other components.

In various embodiments, the terminal enclosure 105 may be coupled to one or more cables, including the first provider cable 140 and second provider cable 145. In some embodiments, each of the one or more provider cables may further include a plurality of provider transmission lines communicatively coupled to the network 160 via the OLT 150, or DSLAM 155. The plurality of provider transmission lines may include assigned and unassigned transmission lines that may be coupled, or later assigned, to one of the plurality of NIDs 125. Accordingly, the terminal enclosure 105 may further be coupled to the plurality of NIDs 125 via a plurality of subscriber lines 120. In some embodiments, each of the plurality of subscriber lines 120 may be coupled to a respective provider transmission line of the plurality of provider transmission lines. For example, in various embodiments, the terminal enclosure 105 may include a set of wiring terminals to which the plurality of provider transmission lines may be connected. The wiring terminals may then allow respective subscriber lines of the plurality of subscriber lines 120 to connect to a respective provider transmission line. Wiring terminals may include, without limitation, punchdown boards, cross connects, quick connects, switches, splice devices, splitters, repeaters, routers, or other suitable terminations. In the case of fiber optic cables, the wiring terminals may include fiber optic terminations, such as, without limitation, distribution frames, interconnects, optical transceivers, switches, splices, and patch boards. In further embodiments, the provider transmission lines may, alternatively or additionally, be spliced individually to a respective subscriber line 120A-120C of the plurality of subscriber lines 120 within the terminal enclosure 105.

In some embodiments, the first and second provider cables 140, 145 may each respectively include a different type of provider transmission line. The types of transmission lines within the first or second provider cables 140, 145 may include various types of conductors, transmission lines, and sub-cables, including, without limitation, optical fiber, twisted pair (e.g., Ethernet cables, telephone cables, etc.), copper wire conductors, and coaxial cables. Accordingly, in some embodiments, the first provider cable 140 may include a plurality of fiber optic transmission lines, while the second provider cable 145 may include a plurality of twisted pair cables. The first provider cable 140 may, therefore, be the physical medium from the terminal enclosure 105 to the OLT 150. The second provider cable 145 may include a plurality of twisted pair cables. The second provider cable 145 may, in turn, be the physical medium from the terminal enclosure 105 to the DSLAM 155. Therefore, as previously described, in some further embodiments, the wiring terminals of the terminal enclosure 105 may allow the plurality of subscriber lines 120 to be coupled to the second provider cable 145, thereby establishing a connection between the plurality of NIDs 125 and the DSLAM 155. As depicted, in some embodiments, the terminal enclosure 105 may house at least part of two provider cables—the first provider cable 140 and the second provider cable 145. In alternative embodiments, the terminal enclosure 105 may be configured to house at least part of just the first provider cable 140, or in other embodiments, to house at least part of two or more provider cables.

While the FIG. 1 depicts embodiments where the terminal enclosure 105 may be coupled to one or more of an OLT 150 or DSLAM 155, it is to be understood that the OLT 150 and DSLAM 155, and associated connections, are used by way of example only and should not be taken as limiting. It is to be understood that in other embodiments, other remote access devices may be utilized, including, without limitation, a cable modem termination system (CMTS), and telephone or network switches.

In various embodiments, the terminal enclosure 105 may provide various wiring terminals allowing the plurality of NIDs 125 to be communicatively coupled to network 160. For example, the plurality of NIDs 125 may be coupled to the wiring terminals via the plurality of subscriber lines 120, which are in turn coupled to a respective transmission line of the one or more provider cables 140, 145. Thus, the plurality of NIDs 125 may be communicatively coupled to the network 160, via a connection to the OLT 150 and/or DSLAM 155. In further embodiments, the OLT 150, DSLAM 155, or other remote access device may, in turn, be coupled to a broadband remote access server (BRAS) of the network 160. The connection from the OLT 150 or DSLAM 155 to the network 160 utilize one or more fiber optic cables. In a further, alternative configuration, the OLT 150 and DSLAM 155 may be coupled to each other. In some embodiments, the DSLAM 155 maybe coupled to the network 160 via the OLT 150, or vice versa, the OLT 150 may be coupled to the network 160 via the DSLAM 155. In yet further configurations, the terminal enclosure 105 may include the OLT 150 and/or DSLAM 155, with the terminal enclosure 105 being coupled to a repeater or BRAS of the network 160, and allowing the plurality of NIDs 125 to be directly coupled to a DSLAM or OLT 150 via the plurality of subscriber lines 120.

In addition to the wired connections, according to various embodiments, the terminal enclosure 105 may be configured to provide a wireless connection for one or more of the plurality of NIDs 125. For example, the terminal enclosure 105 may include one or more enclosure transceivers 110. The one or more enclosure transceivers 110 may be coupled, for example, to an OLT 150 via the first provider cable 140. In various embodiments, the first provider cable 140 may be a fiber optic cable. In this example, the enclosure transceiver 110 may, therefore, be a wireless transceiver configured to convert an optical signal, received via the first provider cable 140, into a radio frequency (RF) signal (e.g., wireless signal). In various embodiments, the transceiver 110 may include, without limitation, a radio such as a hardware radio or a software defined radio, a signal processor, driver, mixers, filters, modulators, and demodulators.

In some embodiments, first provider cable 140 may terminate in a wiring terminal, to which the enclosure transceiver 110 may be coupled. Thus, in some embodiments, the enclosure transceiver 110 may be configured to couple to the same type of transmission medium as the transmission lines of the first provider cable 140, while in other embodiments, a different type of transmission medium may be utilized by the enclosure transceiver 110 to couple to one or more transmission lines of the first provider cable 140. In some embodiments, the enclosure transceiver may be configured to couple to one or more transmission lines of the first provider cable 140 directly. Furthermore, in some embodiments, the enclosure transceiver 110 may be configured to be communicatively coupled to one or more transmission lines of the first provider cable 140, whether directly or via a wiring terminal. For example, in some embodiments, the enclosure transceiver 110 may be coupled to a multiplexer/demultiplexer (mux/demux). The mux/demux may be configured to multiplex signals from multiple transmission lines of the first provider cable 140 to a single line coupled to the enclosure transceiver 110. Similarly, signals received via the enclosure transceiver 110 may be demultiplexed to individual transmission lines of the first provider cable 140.

In various embodiments, one or more of the plurality of NIDs 125 may also be configured to be communicatively coupled, via a wireless connection, to the enclosure transceiver 110. This may allow communications to and from one or more of the plurality of NIDs 125 to be carried over the first provider cable 140, and transmitted wirelessly between a respective NID of the plurality of NIDs 125 and the terminal enclosure 105. For example, in some embodiments, the first NID 125A may include a first transceiver 130A coupled to a first antenna 135A, and the second NID 125B may include a second transceiver 130B coupled to a second antenna 135B. Accordingly, the first and second NIDs 125A, 125B may be configured to establish a wireless connection between the first transceiver 130A and enclosure transceiver 110, and between the second transceiver 130B and enclosure transceiver 110. The enclosure transceiver 110 may, therefore, transmit wirelessly signals received via the first provider cable 140 to the first and second NIDs 125A, 125B. The enclosure transceiver 110 may further be configured to transmit, via the first provider cable 140, signals received wirelessly from the first and second NIDs 125A, 125B.

In some embodiments, the terminal enclosure 105 may include one or more wireless transceivers 110, which are in turn coupled to one or more respective enclosure antennas 115. Suitable enclosure transceivers 110 may include, without limitation, RF to optical fiber transceivers, RF to twisted pair transceivers, RF to Ethernet transceivers, or RF transceiver coupled to a coaxial cable. Accordingly, in the above described embodiments, the enclosure transceiver 110 may be an RF to optical fiber transceiver. The enclosure transceiver 110 may, thus, be coupled to the first provider cable 140, which may include one or more fiber optic cables. An individual enclosure transceiver 110 may be coupled to one or more of the individual fiber optic cables to be respectively assigned to one or more of the plurality of NIDs 125. For example, in some embodiments, the enclosure transceiver 110 may be coupled to a plurality of transmission lines of the first provider cable 140. In this configuration, the enclosure transceiver 110 may further be configured to multiplex and demultiplex signals, received via the first provider cable 140 and from the plurality of NIDs 125. In other embodiments, a respective enclosure transceiver 110 may be coupled to each respective transmission line of the first provider cable 140.

The enclosure transceiver 110 may, therefore, transmit and receive data over the first provider cable 140, to an OLT 150, and on to the network 160. In various embodiments, the network 160 may include, without limitation, a provider network, access network, backbone network, core network, public network (e.g., the Internet), or a private network. In some embodiments, the network 160 may further include various network devices, such as repeaters, switches, routers, servers (e.g., a BRAS), edge devices (e.g., edge gateways), and other devices suitable devices for connecting a customer premises to the appropriate network resource.

In various embodiments, the plurality of NIDs 125 may each be a demarcation point associated with a respective customer premises. Types of NIDs 125 may include, without limitation, a twisted pair NID, an optical network terminal (ONT), and phone line terminations. The plurality of NIDs 125 may further include components such as power supplies, batteries, surge protectors, punchdown boards, switches, cross connects, quick connects, distribution boards, splitters, splice devices, among other wiring terminals.

In various embodiments, the first NID 125A may be configured to allow a network 160 to communicate with customer premises equipment (CPE) associated with a first customer premises. Thus, the first NID 125A may be coupled to CPE at a first customer premises via premises wiring associated with the first customer premises. According to some embodiments, the first NID 125A may be configured to be coupled to the terminal enclosure 105 via a first subscriber line 120A of the plurality of subscriber lines 120. The first NID 125A may, in some embodiments, further include a first transceiver 130A coupled to a first antenna 135A. The first subscriber line 120A may, in some examples, be a twisted pair cable, such as an Ethernet or telephone cable. Thus, the NID 125A may be coupled to the terminal enclosure 105 by wired connection via the first subscriber line 120A. The first transceiver 130A may allow the first NID 125A to be coupled to the terminal enclosure 105 wirelessly, alternatively or in addition to the wired connection via the first subscriber line 120A. Accordingly, the first NID 125A may allow the first CPE to communicate with the network 160 via the first subscriber line 120A, which may be coupled to the second provider cable 145. Alternatively, the first NID 125A may allow the first CPE to communicate with the network 160 via the first provider cable 140, via a wireless connection between the enclosure transceiver 110 and the first transceiver 130A.

Thus, the first NID 125A may be configured to allow the first subscriber line 120A, first transceiver 130A, or both the first subscriber line 120A and first transceiver 130A, to be communicatively coupled to CPE via the premises wiring of the first customer premises. For example, if the premises wiring of the first customer premises includes a twisted pair cables (e.g., Cat 5, Cat 6 Ethernet cables), the first transceiver 130A may be an RF to Ethernet transceiver. The first transceiver 130A may be configured to convert RF signals to electrical signals that may be carried by premises wiring associated with the first customer premises, while signals received via the premises wiring may be converted into an RF signal that may be transmitted by the first transceiver 130A via the first antenna 135A.

Similarly, the second NID 125B may be configured to allow a network 160 to communicate with customer premises equipment (CPE) at a second customer premises associated with the second NID 125B. Accordingly, the second NID 125B may be coupled to CPE at a second customer premises via premises wiring associated with the second customer premises. The second NID 125B may be configured to be coupled to the terminal enclosure 105 via a second subscriber line 120B. In some embodiments, the second NID 125B may include a second transceiver 130B coupled to a second antenna 135B. The second subscriber line 120B may be a twisted pair cable, such as an Ethernet or telephone cable. Thus, the second NID 125B may be coupled to the terminal enclosure 105 by wired connection via the second subscriber line 120B. Alternatively, or in addition, the second NID 125B may also be coupled wirelessly to the terminal enclosure 105 via the second transceiver 130B.

Thus, the second NID 125B may be configured to allow the second subscriber line 120B, second transceiver 130B, or both the second subscriber line 120B and second transceiver 130B, to be communicatively coupled to CPE via the premises wiring of the second customer premises. As described previously with respect of the first transceiver 130A, the second transceiver 130B may be configured to convert RF signals to electrical signals that may be carried by premises wiring associated with the second customer premises, and signals received via the premises wiring may be converted into an RF signal that may be transmitted wirelessly via the second antenna 135B.

Accordingly, as with the enclosure transceiver 110, in various embodiments, the first and second transceivers 130A, 130B may include various types of transceivers, including, without limitation, RF to optical fiber transceivers, RF to twisted pair transceivers, RF to Ethernet transceivers, or RF transceiver coupled to a coaxial cable. In some embodiments, the type of transceiver may depend on the type of transmission medium utilized in in the respective customer premises.

In various embodiments, each of the enclosure transceiver 110, first transceiver 130A, and second transceiver 130B may further be configured to establish a wireless connection utilizing signals. For example, the transceivers may utilize various protocols, including, without limitation, IEEE 802.11 protocols (e.g., 802.11ad, 802.11ac, 802.11b/g/n), Bluetooth, and the like. The transceivers may further be configured to communicate at various frequencies and/or frequency spectrums, such as, without limitation, millimeter wave, 5 GHz, microwave, 2.4 GHz, ultra-high frequency (UHF), very-high frequency (VHF), infrared (IR), and other suitable frequencies. In some embodiments utilizing signals at higher frequency, such as, for example, 5 GHz or millimeter waves utilized in 802.11ad communications, the terminal enclosure 105 may be configured to establish a direct line of sight between the enclosure antenna 115, and each of the first and second antennas 135A, 135B of the first and second NIDs 125A, 125B, respectively.

Like the first and second NIDs 125A, 125B, the third NID 125C, may be configured to allow a network 160 to communicate with customer premises equipment (CPE) at a third customer premises associated with the third NID 125C. Accordingly, the third NID 125C may be coupled to CPE at the third customer premises. The third NID 125C may be configured to be coupled to the terminal enclosure 105 via a third subscriber line 120C. According to a set of embodiments, the third NID 125C may be configured such that a third transceiver may be added to, or communicatively coupled to the third NID 120C. In some embodiments, for example, a third NID 125C may include connections to premises wiring of the third customer premises. Accordingly, a third transceiver may be communicatively coupled to the premises wiring of the third customer premises. For example, if the premises wiring of the third customer premises includes a twisted pair cables (e.g., Cat 5, Cat 6 Ethernet cables), the third transceiver may be an RF to Ethernet transceiver. For example, the third transceiver may be configured to convert RF signals to electrical signals that may be carried by premises wiring associated with the third customer premises, while signals received via the premises wiring may be converted into an RF signal that may be transmitted via a third antenna.

Accordingly, each of the plurality of NIDs 125 may provide connectivity to their respective customer premises and/or customer networks from an external network, such as network 160. As previously described, a customer network may rely on various types of physical media (e.g., premises wiring associated with the customer premises). For example, premises wiring may include, without limitation, twisted pair cables such as Ethernet cables (e.g., Cat 5, Cat 6, etc.) or telephone lines, coax cable, copper core conductors (e.g., power line communications such as G.hn), and optical fiber. Accordingly, each of the plurality of NIDs 125 may be configured to interface with a respective premises wiring of an associated customer premises. Transceivers, such as the first and second transceivers 130A, 130B, may correspondingly be configured to couple to the respective premises wiring, and convert between RF signals and signals that may be carried by the respective premises wiring.

In various embodiments, a wireless connection between the enclosure transceiver 110, and first and second transceivers 130A, 130B may be utilized instead of the first and second subscriber lines 120A, 120B as a higher bandwidth option. For example, typically, the first and second subscriber lines 120A, 120B running from the terminal enclosure 105 to the first and second NIDs 125A, 125B utilize copper cables, such as twisted pair cables. Moreover, conventional terminal enclosures may also rely on copper wire connections to a remote access device, such as DSLAM 155. Copper cables are limited in bandwidth and speed compared to other communication mediums, such as optical fiber. Thus, in various embodiments, terminal enclosure 105 may include connections to a remote access device, such as OLT 150, via a fiber optic cable such as the first provider cable 140. Furthermore, replacing the plurality of subscriber lines 120 with fiber optic cables is typically cost prohibitive. Accordingly, a higher bandwidth wireless connection may be provided, as depicted, to first and second NIDs 125A, 125B via the enclosure transceiver 110. Accordingly, first and second NIDs 125A, 125B may include first and second transceivers 130A, 130B configured to facilitate wireless communication with the enclosure transceiver 110, as described above.

Figure 2:
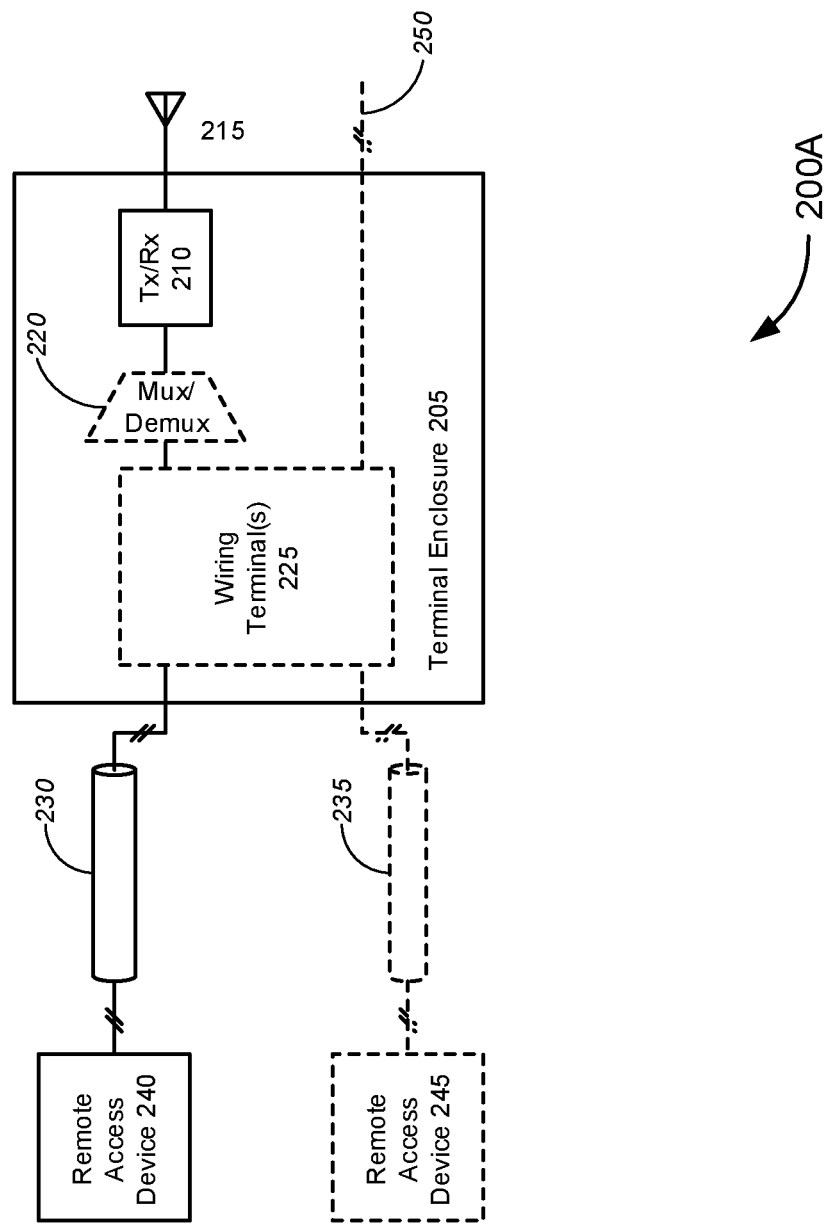
FIG. 2 is a schematic illustration of a wireless base station in a terminal enclosure, in accordance with various embodiments.

FIG. 2 illustrates a system 200 for provisioning a wireless base station terminal enclosure 205, according to various embodiments. The system 200 may include a terminal enclosure 205, transceiver 210, antenna 215, multiplexer/demultiplexer (mux/demux) 220, one or more wiring terminals 225, first provider cable 230, second provider cable 235, first remote access device 240, second remote access device 245, and a plurality of subscriber lines 250. It should be noted that the components of the system 200 are schematically illustrated in FIG. 2, and that a variety of alternative hardware configurations are possible in accordance with various embodiments.

In various embodiments, the terminal enclosure 205 may include a transceiver 210, operatively coupled to an antenna 215 and mux/demux 220. The transceiver 210 may further be coupled to a first remote access device 240, via the first provider cable 230. In some embodiments, the first provider cable 230 may be terminated at one or more wiring terminals 225. One or more transmission lines of the first provider cable 230 terminated in the one or more wiring terminals 225 may further be coupled to the mux/demux 220. Furthermore, the terminal enclosure 205 may be coupled to a second remote access device 245, via a second provider cable 235. The second provider cable 230 may also be terminated in the one or more wiring terminals 225, which may allow connections to be made from individual subscriber lines of the plurality of subscriber lines 250 to respective individual transmission lines of the second provider cable 235.

As previously described with respect to FIG. 1, the terminal enclosure 205 may include any enclosure configured to house at least part of a plurality of transmission lines of the first and second provider cables 230, 235, and at least part of the plurality of subscriber lines 250 to be connected to one or more NIDs. The terminal enclosure 205 may include, without limitation, a service area interface, telecom cabinet, or outside plant, configured to provide wiring terminals, repeaters, switches, etc. for individual lines of a local loop and/or last mile connection associated with individual customer premises. The terminal enclosure 205 may be located between a central office and a demarcation point.

In various embodiments, the terminal enclosure 205 may be coupled to one or more cables. In some embodiments, for example, the terminal enclosure may be coupled to a first provider cable 230. The first provider cable 230 may be a fiber optical cable including a plurality of fiber optic transmission lines. Each of the fiber optic transmission lines may be assigned, or reserved for future assignment, to a specific subscriber or customer premises. Thus, each transmission line of the first provider cable 230 may carry signals (e.g., data, voice, television, etc.) specific to a respective subscriber or customer premises.

In various embodiments, the transmission lines of the first provider cable 230 may be coupled to transceiver 210. In some embodiments, the first provider cable 230 may first be terminated in one or more wiring terminals 225. As previously described with respect to FIG. 1, wiring terminals may include, without limitation, fiber optic terminations such as distribution frames, interconnects, optical transceivers, switches, splices, and patch boards. In other embodiments, each of the transmission lines of the first provider cable 230 may be coupled directly to a respective transceiver 210, or the transceiver 210 may be configured to be coupled to multiple transmission lines of the first provider cable 230.

In some embodiments, the transmission lines of the first provider cable 230 may, optionally, be coupled to a mux/demux 220 before being communicatively coupled to the transceiver 210. For example, if the transmission lines of the first provider cable 230 are individual fiber optic cables, the mux/demux may be an optical multiplexer/demultiplexer, configured to multiplex the optical signals received via a plurality of transmission lines of the first provider cable 230 to a single fiber optic cable. In other embodiments, different types of mux/demux 220 may be utilized, including, without limitation, digital, analog, electronic, and optical. Furthermore, in some embodiments, different multiplexing techniques may be implemented via the mux/demux 220. Multiplexing techniques may include, without limitation, different types of time-division multiplexing (TDM), wavelength division multiplexing (WDM), and frequency division multiplexing (FDM).

In some embodiments, the terminal enclosure 205 may include a converter configured to convert between different types of signals. For example, an optical-to-electrical converter may be utilized to convert between optical and electrical signals. This may allow a different type of transmission medium to couple to the plurality of transmission lines of the first provider cable 230. The converter may be implemented after, before, or within any of the one or more wiring terminals 225, mux/demux 220, or transceiver 210.

In various embodiments, the transceiver 210 may thus be configured to both transmit and receive wireless signals. For example, signals received via the transmission lines of the first provider cable 230 may be transmitted wirelessly, via the antenna 215. Similarly, wireless signals may be received by the transceiver 210, via the antenna. Accordingly, the transceiver 210 may convert between a wireless signal and an appropriate electrical and/or optical signal. For example, in embodiments where the transceiver 210 may be coupled to a fiber optic cable, the transceiver may convert between a wireless signal and optical signal. Thus, the received wireless signal may be transmitted, by the transceiver 210, to the first provider cable 230. Suitable types of transceivers may include, without limitation, RF to optical fiber transceivers, RF to twisted pair transceivers, RF to Ethernet transceivers, or RF transceiver coupled to a coaxial cable.

In various embodiments, the transceiver 210 may further be configured to communicate utilizing various protocols for wireless communications. Suitable protocols may include, without limitation, IEEE 802.11 protocols (e.g., 802.11ad, 802.11ac, 802.11b/g/n), Bluetooth, and the like. The transceiver 210 may further be configured to communicate at various frequencies and/or frequency spectrums, such as, without limitation, millimeter wave, 5 GHz, microwave, 2.4 GHz, UHF, VHF, IR, and other suitable frequencies. In some embodiments utilizing signals at higher frequency, such as, for example, 5 GHz or millimeter waves utilized in 802.11ad communications, the terminal enclosure 205 may be configured to establish a direct line of sight between the antenna 215 and a respective antenna at an NID.

On a provider facing side, the terminal enclosure 205, may be coupled to the first remote access device 240 via the first provider cable 230. The first remote access device 240 may be configured receive signals from the plurality of transmission lines of the first provider cable 230 and aggregate (e.g., multiplex) the signals. Thus, the remote access device 240 may act as an interface to a network such as a provider network or access network. For example, in some embodiments, the first remote access device 240 may be coupled to an edge device of a provider network, configured to provide access to a provider's core network. Edge devices may include, without limitation, edge servers (e.g., broadband remote access server) and edge gateways. Accordingly, in embodiments where the first provider cable 230 includes a plurality of fiber optic cables, the first remote access device 240 may be an OLT.

In some embodiments, the terminal enclosure 205 may further be coupled to a second remote access device 245 via the second provider cable 235. Like the first remote access device 240, the second remote access device 245 may be configured to receive signals from a plurality of transmission lines of the second provider cable 235 and multiplex the signals to be carried over a single line to a provider network. Unlike the first remote access device 240, however, a different type of transmission medium may be utilized in the second provider cable 235 and for transmission to an edge device of the provider network. For example, in some embodiments, the second provider cable 235 may include a plurality of twisted pair cables. Accordingly, the second remote access device 240 may be a DSLAM.

In various embodiments, like the first provider cable 230, the transmission lines of the second provider cable 235 may be terminated in one or more wiring terminals 225. Each of the transmission lines of the second provider cable 235 may be coupled, via the one or more wiring terminals 225, to a respective subscriber line of the plurality of subscriber lines 250. The plurality of subscriber lines 250 may be configured to provide a wired connection to a customer premises (e.g., NID). In some embodiments, each of the plurality of subscriber lines 250 may include, without limitation, copper conductor cables such as a twisted pair cable (e.g., telephone line).

In conventional practice, to achieve higher transmission speeds, the plurality of subscriber lines 250 would need to be replaced with a faster wired transmission medium, and in some examples, the second provider cable 235 may also need to be replaced. Replacing physical wired transmission media is typically cost, time, and labor intensive. Accordingly, the terminal enclosure 205 may be configured to allow a wireless connection to be established with an NID of a customer premises, eliminating the need to install new or replace existing wired transmission media such as the plurality of subscriber lines 250. The terminal enclosure 205 may, thus, provide access to the provider network over faster transmission media found in the first provider cable 230, by creating a wireless connection via the transceiver 210.

Figure 3:
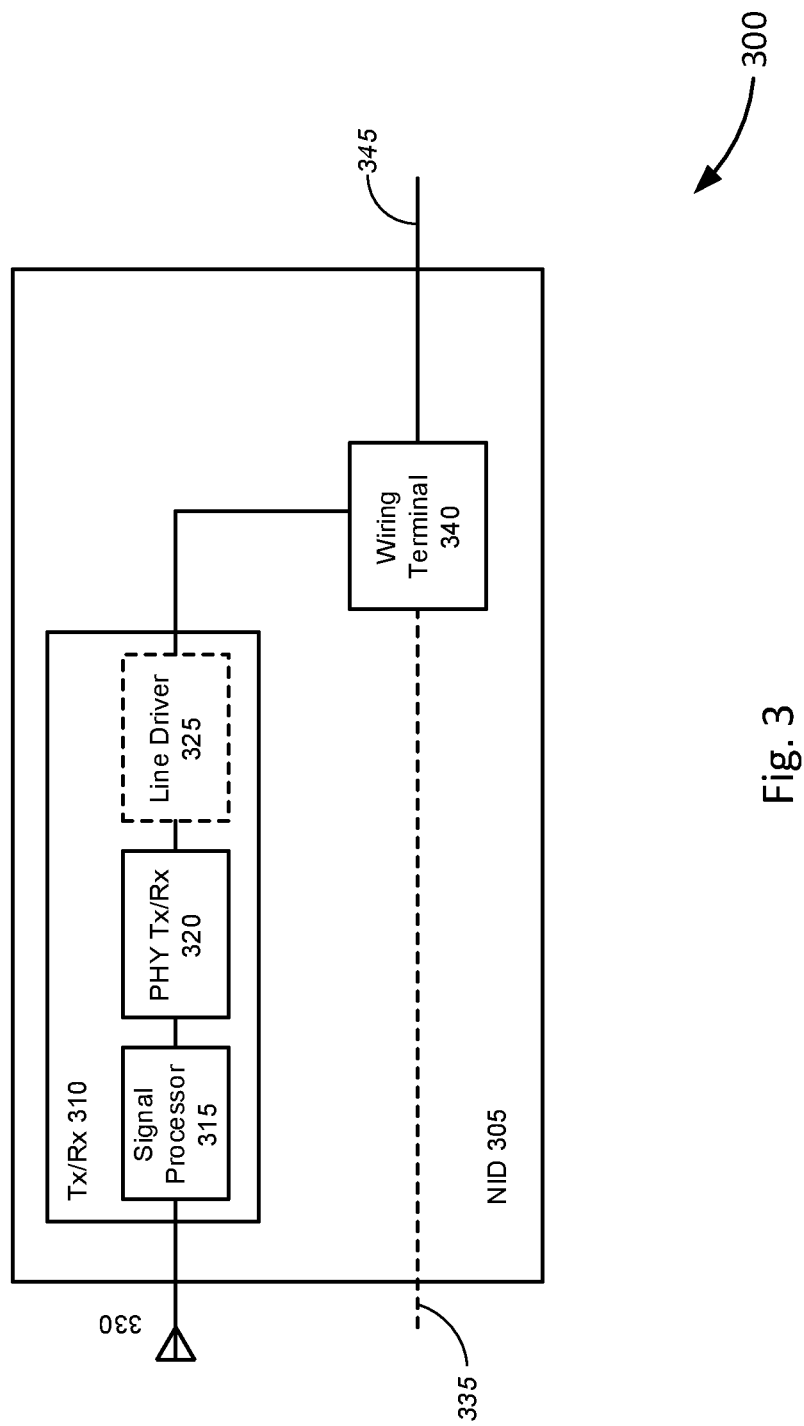
FIG. 3 is a schematic illustration of a network interface device in communication with the wireless base station, in accordance with various embodiments.

FIG. 3 is a schematic illustration of a customer facing side of a system 300 for provisioning a wireless base station terminal enclosure, in accordance with various embodiments. The customer facing side of the system 300 may include an NID 305, transceiver 310, signal processor, physical layer (PHY) transceiver 320, line driver 325, antenna 330, subscriber line 335, wiring terminal 340, and premises wiring 345. It should be noted that the components of the system 300 are schematically illustrated in FIG. 3, and that a variety of hardware configurations are possible in accordance with various embodiments.

In various embodiments, the NID 305 may include a transceiver 310 operatively coupled to an antenna 330. The transceiver 310 may further include a signal processor 315, PHY transceiver 320, and optionally a line driver 325. The transceiver 310 may be coupled, via the wiring terminal 340, to the premises wiring 345. Accordingly, the wiring terminal 340 may be configured to provide a physical interface to and from the premises wiring 345. In some further embodiments, a subscriber line 335 may also be coupled to the wiring terminal 340, from which the subscriber line 335 may be coupled to premises wiring 345.

As previously described, wiring terminal 340 may include, without limitation, punchdown boards, cross connects, quick connects, switches, splice devices, splitters, repeaters, routers, or other suitable terminations. In the case of fiber to the home applications, the NID 305 may be an ONT, and wiring terminal 340 may include fiber optic terminations, such as, without limitation, distribution frames, interconnects, optical transceivers, switches, splices, and patch boards.

In various embodiments, the NID 305 may be a demarcation point of a customer premises (e.g., customer network). Accordingly, the NID 305 may provide an interface from which service provider owned lines (such as subscriber line 335) may be connected to premises wiring 345. For example, in some embodiments, premises wiring 345 may be made accessible via the wiring terminal 340. As such, the premises wiring 345 may itself be terminated in the wiring terminal 340. Accordingly, premises wiring 345 may include any wiring that goes into a customer premises or provides physical access to the customer network. Premises wiring 345 may include, without limitation, twisted pair cabling such as Ethernet cable (e.g., Cat 5, Cat 6, etc.), coax cable, fiber optic cable, among others.

In some embodiments, the NID 305 may be coupled to a subscriber line 335. As previously described, subscriber line 335 may be a physical, wired transmission medium, such as a twisted pair cable. The wires of the twisted pair cable may, thus, be terminated in the wiring terminal 340, from which connection may be made to the premises wiring 345. Accordingly, a wired connection may be established between the customer premises (e.g., premises wiring 345) and a terminal enclosure, via the subscriber line 335. As previously discussed, the subscriber line may be configured to provide a wired connection to a customer premises (e.g., NID 305). In some embodiments, subscriber lines 335 may include different types of transmission media, including, without limitation, copper conductor cables such as a twisted pair cable (e.g., telephone line, Ethernet cable, etc.). In various embodiments, the subscriber line 335 may limit communication speed and bandwidth in the connection from a provider to a customer network.

As previously discussed, physically replacing the subscriber line 335 includes cost, time, and labor-intensive processes. Thus, the NID 305 may be configured to allow a wireless connection to be established with a terminal enclosure, eliminating the need to install new or replace existing wired transmission media such as the subscriber line 335. The NID 305 may, thus, provide access to the customer and/or provider network over a faster transmission media (e.g., wireless) than the subscriber line 335.

Accordingly, in various embodiments, the NID 305 may include a transceiver 310 that may be wirelessly coupled to a terminal enclosure. The transceiver 310 may establish a wireless connection, via the antenna 330, with a transceiver of the terminal enclosure. As previously described, in some embodiments, the transceiver of the terminal enclosure may transmit a multiplexed signal carrying data for one or more different customer premises. Accordingly, to ensure data for the correct recipient is received, the transceiver 310 may further include a signal processor 315 configured to handle the signal received from the terminal enclosure. On the transmit side, the transceiver 310 may further be configured to transmit data, received from the customer premises via premises wiring 345, wirelessly to the terminal enclosure. Therefore, the signal processor 315 may include, without limitation, one or more of filters, mixers, modulators, and demodulators. For example, after a signal is received from the terminal enclosure, the signal processor 315 may be configured to filter out the signals associated with other customer premises. The signal processor 315 may further demodulate the signal to extract data from the wireless signal. The PHY transceiver 320 may then be configured to transmit the signal over a physical medium, such as a transmission line connecting the transceiver to the wiring terminal 340, or premises wiring 345. For example, the PHY transceiver 320 may include, without limitation, an optical PHY transceiver, Ethernet PHY transceiver, or wireless PHY transceiver.

In some embodiments, an optional line driver 325 may be utilized to drive the signal from the transceiver over a transmission line, such as the premises wiring 345. For example, the line driver 325 may be utilized for high-power applications, such as power line communications. In some further embodiments, the line driver 325 may be utilized to drive the antenna 330, to transmit a wireless signal received from the customer premises via premises wiring 345.

In various embodiments, the transceiver 310 may be coupled to the wiring terminal 340 via a wired transmission medium. Suitable transmission media for connecting the transceiver 310 to the wiring terminal 340 may include, without limitation, twisted pair cabling, coax cable, or fiber optic cable. In some embodiments, the same type of transmission medium may be used as premises wiring 345. For example, if premises wiring 345 is a cat 6 Ethernet cable, cat 6 Ethernet cable may be utilized to connect the transceiver 310 to the wiring terminal 340.

Figure 4:
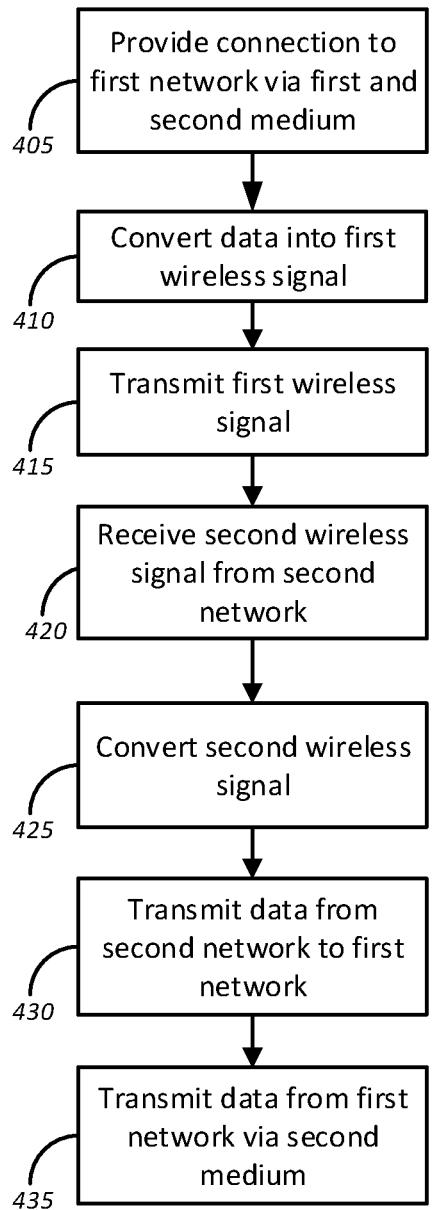
FIG. 4 is a flow diagram of a method for provisioning a wireless base station at an existing terminal enclosure, in accordance with various embodiments.

FIG. 4 is a flow diagram of a method 400 for provisioning a wireless base station at an existing terminal enclosure, in accordance with various embodiments. The method 400 starts, at block 405, with providing a connection to a first network via a first and second medium. As described above with respect to previous embodiments, a connection to a may be provided to a first network via two different types of transmission media. For example, in some embodiments, the first network may be a provider network. Accordingly, a connection to the provider network may be provided by a network device, such as a terminal enclosure. The terminal enclosure may, therefore, be connected to the provider network via a first provider cable and a second provider cable. The first provider cable may include a plurality of transmission lines of a first type, and the second provider cable may include a plurality of transmission lines of a second type. Types of transmission media may include, without limitation, twisted pair, coax, or fiber optic cables. Accordingly, in some embodiments, the first provider cable may include a plurality of fiber optic cables and the second provider cable may include a plurality of twisted pair cables.

The method 400 continues, at block 410, by converting data, received from the first network, into a first wireless signal. In various embodiments, the terminal enclosure may include a wireless transceiver configured to convert data received from a wired transmission medium into a wireless signal. For example, in some embodiments, the terminal enclosure may receive data from the provider network via the first provider cable. The first provider cable may include a plurality of fiber optic cables. Accordingly, the plurality of fiber optic cables may be coupled to a wireless transceiver of the terminal enclosure. The wireless transceiver may, therefore, be configured to convert an optical signal to a wireless signal and received wireless signals into optical signals. As discussed previously, it is to be understood that in other embodiments, other types of transceivers may be utilized to convert between different types of signals.

At block 415, the transceiver may then transmit the first wireless signal. In various embodiments, the first wireless signal may be transmitted to one or more NIDs. Each of the one or more network interface devices may be associated with a respective customer network of a customer premises. Accordingly, the transceiver of the terminal enclosure may transmit a wireless signal, via an associated antenna of the terminal enclosure, to one or more customer networks. As previously described, the terminal enclosure transceiver may receive signals from a transmission lines of a provider cable. Accordingly, the terminal enclosure may further include a mux/demux configured to multiplex the plurality of signals the plurality of transmission lines into a single multiplexed signal, which may then be transmitted wirelessly.

At block 420, the transceiver may further receive a second wireless signal. In various embodiments, an NID in wireless communication with the terminal enclosure may further transmit data wirelessly from an associated customer network. Accordingly, the transceiver may receive a second wireless signal from a second network associated with the NID.

At block 425, the transceiver may be utilized to convert the second wireless signal into a wired signal. As previously described, in various embodiments, the transceiver of the terminal enclosure may further be configured to receive one or more wireless signals from one or more NIDs. Accordingly, a mux/demux may be utilized to demultiplex the plurality of wireless signals into a respective transmission line of the plurality of transmission lines of the provider cable. The transceiver may, after demultiplexing, convert each of the received wireless signals, including the second wireless signal, into a wired signal.

At block 430, data from the second network (e.g., customer network), may be transmitted to the first network. Accordingly, in various embodiments, the converted signal may be carried by the wired transmission line of the provider cable to the first network (e.g., provider network).

At block 435, data received from the first network via the second medium, such as a second provider cable, may be transmitted to an NID utilizing a wired connection of the same type as the second medium. For example, in various embodiments, the second provider cable may be a twisted pair cable, such as a telephone line or Ethernet cable. Accordingly, data received via the second provider cable may be transmitted to another network device via a wired subscriber line. In embodiments where the second provider cable is a telephone line, the subscriber line may also be a telephone line. Accordingly, the terminal enclosure may transmit data received via the second medium (e.g., second provider cable) via a wired connection, whereas data received via the first medium (e.g., first provider cable) may be transmitted via a wireless connection.

While certain features and aspects have been described with respect to exemplary embodiments, one skilled in the art will recognize that numerous modifications are possible. For example, the methods and processes described herein may be implemented using different combinations of hardware components. Further, while various methods and processes described herein may be described with respect to structural and/or functional components for ease of description, methods provided by various embodiments are not limited to any specific structural and/or functional architecture, but instead can be implemented utilizing any suitable configuration or arrangement of parts. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
   a first network device communicatively coupled to a first network via a first medium and a second medium, the first network device comprising:
   a first transceiver coupled to the first medium;
   a first antenna operatively coupled to the first transceiver;
   a second network device communicatively coupled to a second network, the second network device comprising:
   a second transceiver in communication with the second network;
   a second antenna operatively coupled to the second transceiver;
   wherein the second network device is configured to transmit data from the second network to the first transceiver, and receive data from the first network via the second transceiver;
   wherein the first network device is configured to:
   transmit data received from the second network, via the first transceiver, to the first network, via the first medium, and
   transmit data received from the first network, via the first medium, to the second network, via the first transceiver; and
   wherein the first network device is communicatively coupled to at least one other network device via a wired connection of the same type as the second medium, wherein the first network device is configured to couple at least one other network associated with the at least one other network device to the first network.

2. The system of claim 1, wherein the first medium is optical fiber.

3. The system of claim 2, wherein the first transceiver is further configured to convert a wireless signal received by the first antenna to an optical signal.

4. The system of claim 1, wherein the first transceiver is configured to convert data received via the first medium into a wireless signal via the first antenna.

5. The system of claim 1, wherein the second network device is coupled to the second network via a wired connection.

6. The system of claim 5, wherein the second transceiver is further configured to convert wireless data received via the second antenna to an Ethernet signal, wherein the wire connection is a twisted pair cable configured for Ethernet communication.

7. The system of claim 1, wherein the first and second transceivers are configured to communicate utilizing millimeter wave signals.

8. The system of claim 1, wherein the first and second transceivers are configured to communicate utilizing microwave signals.

9. The system of claim 1, wherein the first and second transceivers are configured to communicate utilizing in radio frequencies in at least one of ultra-high frequency (UHF) and very-high frequency (VHF) bands.

10. The system of claim 1, wherein the first network is a provider network.

11. The system of claim 1, wherein the second network device is a network interface device configured to provide an interface to the second network, wherein the second network is a customer network associated with a customer premises.

12. The system of claim 11, wherein the second network device is further configured to allow customer premises equipment on the second network to access the first network.

13. The system of claim 1, wherein the first transceiver is further configured to:
transmit data received from a plurality of transceivers, different from the second transceiver, to the first network via the first medium; and
transmit data, respective to each of the plurality of transceivers, received from the first network, via the first medium, to a respective transceiver of the plurality of transceivers.

14. An apparatus comprising:
a network device configured to communicate with a first network via a first and second medium;
a transceiver coupled to the first network via the first medium, the transceiver comprising:
a radio transmitter configured to convert data received from the first network, via the first medium, to a first wireless signal;
an antenna operatively coupled to the radio transmitter and configured to transmit the first wireless signal to a receiving device, wherein the antenna is further configured to receive a second wireless signal from a second network;
a radio receiver, coupled to the antenna, and configured to convert the second wireless signal into data received from the second network, and transmit the data received from the second network to the first network via the first medium; and
wherein the network device is configured to communicatively couple to at least one other network device via a wired connection of the same type as the second medium, wherein the network device is configured to communicatively couple at least one other network associated with the at least one other network device to the first network.

15. The apparatus of claim 14, wherein the first medium is optical fiber.

16. The apparatus of claim 15, wherein the radio transmitter is configured to convert an optical signal, received from the first network into the first wireless signal, and the radio receiver is configured to convert the second wireless signal into a second optical signal.

17. The apparatus of claim 14, wherein transceiver is configured to communicate in the millimeter wave spectrum.

18. The apparatus of claim 14, wherein the transceiver is configured to communicate in the microwave spectrum.

19. The apparatus of claim 14, wherein the transceiver is further configured to:
transmit data received from a plurality of other transceivers to the first network via the first medium; and
transmit data, respective to each of the plurality of other transceivers, received from the first network, via the first medium, to a respective transceiver of the plurality of other transceivers.

20. A method comprising:
providing, at a network device, one or more connections to a first network via a first medium and a second medium;
converting, with a transceiver of the network device, data from the first network received via the first medium into a first wireless signal;
transmitting, via the transceiver, the first wireless signal to a network interface device;
receiving, via the transceiver, a second wireless signal from a second network associated with the network interface device;
converting, with the transceiver, the second wireless signal to data received from the second network;
transmitting the data received from the second network to the first network via the first medium; and
transmitting data received from the first network via the second medium to another network device utilizing a wired connection of the same type as the second medium.

* * * * *